US007763829B2

(12) United States Patent
Tanaka et al.

(10) Patent No.: US 7,763,829 B2
(45) Date of Patent: Jul. 27, 2010

(54) CERAMIC HEATER-TYPE GLOW PLUG

(75) Inventors: Arihito Tanaka, Higashimatsuyama (JP); Jian Zhao, Higashimatsuyama (JP)

(73) Assignee: Bosch Corporation, Tokyo (JP)

( * ) Notice: Subject to any disclaimer, the term of this patent is extended or adjusted under 35 U.S.C. 154(b) by 753 days.

(21) Appl. No.: 10/582,441

(22) PCT Filed: Dec. 8, 2004

(86) PCT No.: PCT/JP2004/018288

§ 371 (c)(1),
(2), (4) Date: Apr. 23, 2007

(87) PCT Pub. No.: WO2005/061963

PCT Pub. Date: Jul. 7, 2005

(65) Prior Publication Data

US 2007/0289960 A1 Dec. 20, 2007

(30) Foreign Application Priority Data

Dec. 19, 2003 (JP) ............................ 2003-422811

(51) Int. Cl.
*H05B 6/76* (2006.01)
*C04B 35/52* (2006.01)

(52) U.S. Cl. ........................................ 219/270; 501/87

(58) Field of Classification Search ......... 219/260-270; 338/262; 501/87
See application file for complete search history.

(56) References Cited

U.S. PATENT DOCUMENTS 3,681,737 A * 8/1972 Magnusson et al. ......... 338/262
5,852,280 A 12/1998 Mizuno
6,049,065 A * 4/2000 Konishi ..................... 219/270

(Continued)

FOREIGN PATENT DOCUMENTS

JP 58-112862 8/1983

(Continued)

OTHER PUBLICATIONS

Japanese language Office Action of Jan. 15, 2008 (2 pages).

(Continued)

*Primary Examiner*—Daniel Robinson
(74) *Attorney, Agent, or Firm*—Flynn, Thiel, Boutell & Tanis, P.C.

(57) ABSTRACT

A ceramic glow plug which prevents the occurrence of damage on a small diameter portion formed on a rear end portion of a ceramic heater fixed in a metallic outer sleeve. The rear end portion of the ceramic heater is positioned inside the metallic outer sleeve, and the small diameter portion is formed on the rear end portion. The rear-end small diameter portion of the ceramic heater is connected to an electrode lead-out member for taking out a positive electrode of a heat generating material. Granulated powder (alumina, for example) made of inorganic insulating material is filled in around a connecting portion of the ceramic heater in the metallic outer tube and the electrode lead-out-wire, and in addition, an insulating material is sealed outside the granulated powder. Thereafter, swaging is performed to bring the insulating material into a highly dense state thus fixing the electrode lead-out wire and an electrode lead-out rod in the metallic outer sleeve.

11 Claims, 2 Drawing Sheets

U.S. PATENT DOCUMENTS

| | | | | |
|---|---|---|---|---|
| 6,326,595 | B2 * | 12/2001 | Taniguchi et al. | 219/270 |
| 7,282,670 | B2 * | 10/2007 | Matsubara et al. | 219/270 |
| 2003/0092557 | A1 * | 5/2003 | Aichele et al. | 501/87 |
| 2005/0274707 | A1 * | 12/2005 | Matsubara et al. | 219/270 |

FOREIGN PATENT DOCUMENTS

| | | |
|---|---|---|
| JP | 60-000217 | 1/1985 |
| JP | 62-143382 A | 6/1987 |
| JP | 11-233239 A | 8/1999 |
| JP | 11-237045 | 8/1999 |
| JP | 2000-121055 | 4/2000 |
| JP | 2000-356343 | 12/2000 |
| JP | 2002-206739 A | 7/2002 |
| KR | 1998-80845 | 11/1998 |

OTHER PUBLICATIONS

Chinese language First Office Action of Jun. 6, 2008 4 pages).
Chinese language Second Office Action of Dec. 19, 2008 (4 pages).
Chinese language Third Office Action of Apr. 17, 2009 (5 pages).
Chinese language Fourth Office Action of Aug. 21, 2009 (3 pages).

* cited by examiner

CERAMIC HEATER-TYPE GLOW PLUG

FIELD OF THE INVENTION

The present invention relates to a ceramic heater-type glow plug which is used for assisting the start-up of a diesel engine, and more particularly to a ceramic heater-type glow plug which seals an insulating material such as magnesium oxide as a sealing material in the inside of a metal outer sleeve which holds a ceramic heater.

BACKGROUND OF THE INVENTION

A ceramic heater-type glow plug which is used for assisting the start-up of a diesel engine is, in general, configured as follows. A rear portion side of a ceramic heater is held inside a metallic outer sleeve in a state that a heat generating portion formed on a distal end of the ceramic heater projects to the outside of the metallic outer sleeve. A rear end of the metallic outer sleeve is inserted and fixed in the inside of a front end portion of a cylindrical housing which is a fitting for mounting the plug on a cylinder head of an engine. One electrode (negative electrode) of the ceramic heater is taken out to an outer surface of a heater body and is electrically connected to an inner surface of the metallic outer sleeve and, at the same time, the other electrode (positive electrode) is taken out to the outside from a rear end side of the heater body by way of an electrode lead-out fitting and is electrically connected to an external connection terminal which is fixed to the rear end portion of the housing by way of an insulating member.

In the above-mentioned ceramic heater-type glow plug, there has been proposed a technique which grinds a rear end portion of a ceramic heater thus forming a small-diameter portion for connecting a positive electrode side of the ceramic heater and an electrode lead-out fitting (see patent document 1, for example).

Recently, to satisfy the restriction of an exhaust gas emission, a combustion system of a diesel engine has been shifted from a type which includes a sub combustion chamber to a directly injecting type, that is, a direct injection type and, further, the development of a multi-valve formation has been in progress. A glow plug used in such a direct-injection-type diesel engine faces a main combustion chamber through a wall surface of a cylinder head and hence, it is necessary to elongate a total length of the plug and also to reduce a diameter thereof compared to a glow plug which preheats the sub combustion chamber.

Further, it is necessary to increase a thickness of the cylinder head to ensure strength of the cylinder head and hence, an insertion hole for mounting the glow plug is required to be extremely fine and elongated whereby it is necessary to make the glow plug extremely elongated correspondingly.

To satisfy the above-mentioned requirement on the elongation of the glow plug and also to realize the reduction of cost by shortening a total length of the ceramic heater, there has been already known a glow plug having the structure in which a ceramic heater is fixed to one end side of a metallic outer sleeve in a state that a distal-end heat generating portion of the ceramic heater in which a heat generating material is embedded projects to the outside the metallic outer sleeve and, at the same time, a rear end side of the ceramic heater to which an electrode lead-out fitting is connected is positioned inside the metallic outer sleeve.

In the glow plug which is configured such that a positive electrode which is exposed on a rear end portion of the ceramic heater and the electrode lead-out fitting are connected with each other in the inside of the metallic outer sleeve, a heat-resistant insulating powder made of magnesium oxide (MgO) or the like is sealed in the inside of the metallic outer sleeve, and the heat-resistant insulating powder is brought into a highly dense state by swaging or the like, thus firmly fixing the electrode lead-out fitting.

In such a constitution which connects the positive electrode of the ceramic heater and the electrode lead-out fitting in the inside of the metallic outer sleeve, it is necessary to further reduce a diameter of the rear end portion of the ceramic heater and hence, breaking of the rear end portion must be sufficiently taken into consideration.

Patent document 1: Japanese Patent Laid-open Hei10-332149 (page 4 to 5, FIG. 1).

SUMMARY OF THE INVENTION

However, heat-resistant insulating powder made of magnesium oxide or the like which is filled in the inside of the metallic outer sleeve is a polycrystalline material having a relatively high rigidity and hence, when the deformation or the like of the metallic outer sleeve is generated, a force acts on the small-diameter portion of the ceramic heater by way of this magnesium oxide thus giving rise to a possibility that the small diameter portion is broken.

The present invention has been made to overcome the above-mentioned drawback and it is an object of the present invention to provide a ceramic heater-type glow plug which can eliminate the possibility of breaking of a ceramic heater even when a bending stress acts on a distal end side of the ceramic heater or a metallic outer sleeve is deformed.

The present invention is directed to a ceramic heater-type glow plug which includes a ceramic heater, a metallic outer sleeve one end portion of which holds the ceramic heater and another end portion of which is fixed in an inner hole of a housing, an electrode lead-out member which is connected to one electrode of the ceramic heater in the inside of the metallic outer sleeve, and an insulating material which is filled in the metallic outer sleeve as a sealing material, wherein a granulated powder made of an inorganic insulating material is filled around a connecting portion of the ceramic heater and the electrode lead-out member.

Further, a small-diameter portion is formed on an end portion of the ceramic heater which is positioned inside the metallic outer sleeve, and the electrode of the ceramic heater and the electrode lead-out member are connected to each other on the small-diameter portion.

Still further, the granulated powder is formed of a granulated material made of fine powder with primary particles having a particle size of 5 μm or less.

In addition, a particle size of the granulated material is a value which falls within a range from 30 to 200 μm.

Further, the insulating material filled in the inside of the metallic outer sleeve is heat-resistant insulating powder which is brought into a highly dense state by swaging after being filled.

The ceramic heater-type glow plug of the present invention provides an advantageous effect to eliminate the possibility of breaking of a rear-end-portion side of a ceramic heater which is positioned inside the metallic outer sleeve even when a bending stress acts on a distal end portion of the ceramic heater or the metallic outer sleeve is deformed.

DETAILED DESCRIPTION

With the simple constitution that granulated powder made of an inorganic insulating material is filled around a connecting portion of a rear-end-portion side of a ceramic heater which is positioned inside a metallic outer sleeve and an electrode lead-out member, it is possible to achieve an object of the present invention that the breaking of the ceramic heater can be prevented.

Figure 1:
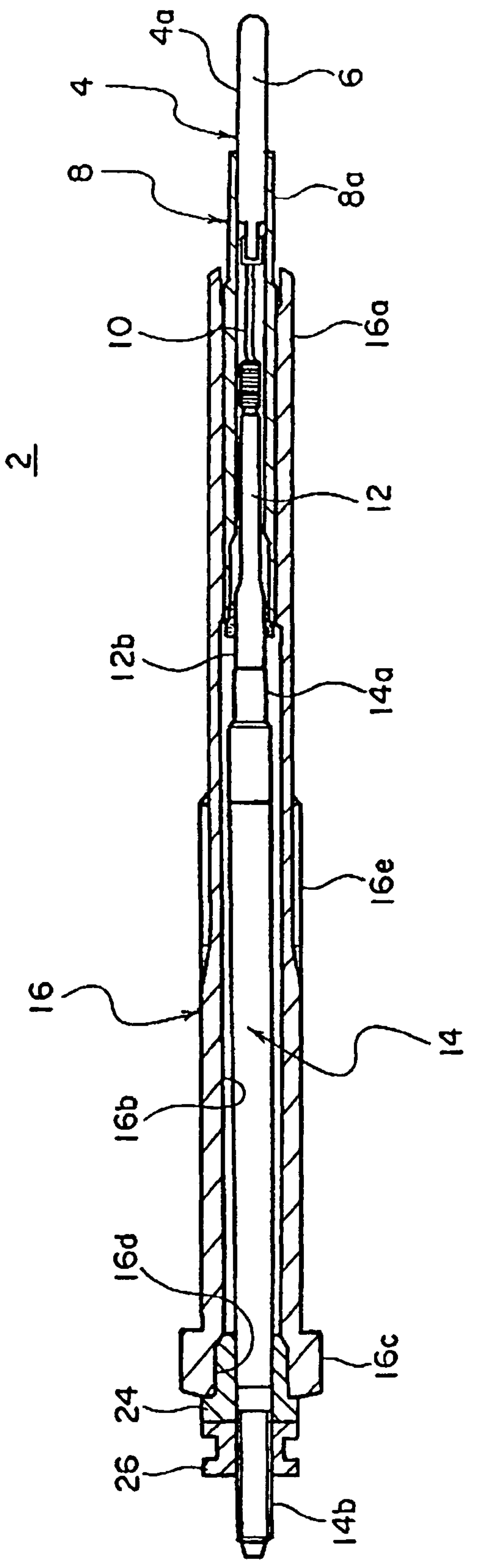
FIG. 1 is a longitudinal cross-sectional view of a ceramic heater-type glow plug (embodiment 1).
Figure 2:
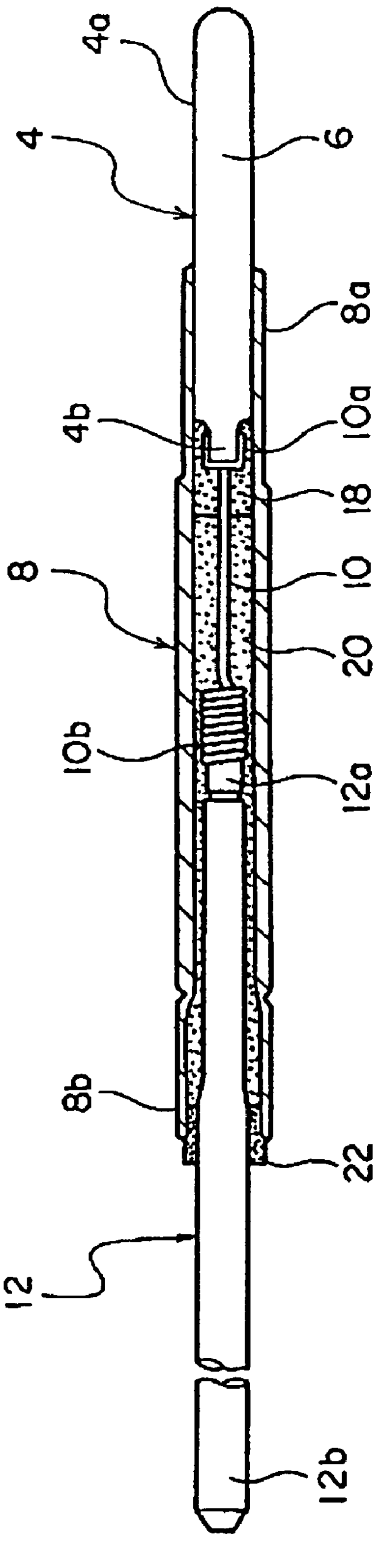
FIG. 2 is a longitudinal cross-sectional view showing an essential part of the ceramic heater-type glow plug in an enlarged manner.

Hereinafter, the present invention is explained in conjunction with an embodiment shown in drawings. FIG. 1 is a longitudinal cross-sectional view of a glow plug for a diesel engine (the whole constitution being indicated by symbol 2) according to one embodiment of the present invention, and FIG. 2 is an enlarged view of an essential part of the ceramic heater-type glow plug. The glow plug 2 of this embodiment is a ceramic heater-type glow plug which includes a ceramic heater 4.

In the ceramic heater 4, a heat generating material not shown in the drawing is embedded in a ceramic insulating material 6 which constitutes a body portion of the ceramic heater 4. A negative electrode side of the heat generating material is taken out to an outer peripheral surface of the ceramic insulating material 6, and is electrically connected to an inner surface of a sheath (metallic outer sleeve) 8 explained later by bonding with blazing or the like. On the other hand, a positive electrode side of the heat generating material extends to an end portion (a rear end portion which is positioned at a left end in FIG. 1 and FIG. 2) opposite to a distal end portion 4*a* where the heat generating material of the ceramic heater 4 is embedded, and is exposed on an outer surface of a small diameter portion 4*b* which is formed on the rear end portion by grinding or the like. To the rear-end small-diameter portion 4*b* of the ceramic heater 4, a cup-shaped portion 10*a* which is formed on a distal end of an electrode lead-out wire 10 which constitutes an electrode lead-out member is fitted and is electrically connected with the positive electrode side of the heat generating material which is exposed on the outer surface of the small-diameter portion 4*b* of the ceramic heater 4.

A rear end portion 10*b* of the electrode lead-out wire 10 is formed in a coil shape, and a distal end portion 12*a* of an electrode lead-out rod 12 which is made of a rigid conductive metal body is inserted into the coil portion 10*b* to be electrically connected to each other. Further, a rear end portion 12*b* of the electrode lead-out rod 12 is fixed to a distal end portion 14*a* of an external contact terminal 14 by butt welding or the like. Here, in this embodiment, the electrode (positive electrode) is taken out to the outside using the electrode lead-out wire 10 and the electrode lead-out rod 12. However, the electrode take-out structure is not limited to such a constitution and may adopt the constitution which connects the positive electrode of the ceramic heater 4 and the external connecting terminal 14 using one wire.

The ceramic heater 4 having the above-mentioned constitution is bonded to the inside of the metallic outer sleeve 8 by blazing or the like, and the ceramic heater 4 is fixed to a cylindrical housing 16 which constitutes a mounting fitting for a cylinder head of an engine (not shown in the drawing) by way of the metallic outer sleeve 8.

The electrode lead-out wire 10 and the electrode lead-out rod 12 which are electrically connected to the positive electrode side of the heat generating material of the ceramic heater 4 are fixed to the metallic outer sleeve 8 by swaging or the like. The fixing step of these parts by swaging is explained. First of all, the rear-end-side of ceramic heater 4 on which the small diameter portion 4*b* is formed is inserted into the inside of a distal end portion 8*a* of the metallic outer sleeve 8 and is fixed by blazing or the like while the cup portion 10*a* which is formed on the distal end of the electrode lead-out wire 10 is fitted on and around the small-diameter portion 4*b* of the ceramic heater 4 which is positioned in the inside of the distal end portion 8*a* of the metallic outer sleeve 8. Further, the distal end 12*a* of the electrode lead-out rod 12 is inserted into the coil-shaped portion 10*b* which is formed on the rear end portion of the electrode lead-out wire 10.

As described above, the ceramic heater 2 is fixed to the metallic outer sleeve 12 at the position close to the distal end portion 8*a* thereof, and the electrode lead-out wire 10 and the electrode lead-out rod 12 are connected to each other in the inside of the metallic outer sleeve 8. Thereafter, first of all, a granulated powder made of an inorganic insulating material (see a portion indicated by 18 in FIG. 2) is filled from an opening portion 8*b* formed in the rear portion side of the metallic outer sleeve 8. The granulated material 18 is constituted of fine powder containing primary particles of 5 μm or less, wherein a particle size of the fine powder is preferably set to a value which falls within a range from 30 to 200 μm. Further, the granulated powder 18 only has to be of a material which exhibits heat resistance up to approximately 500° C. and exhibits excellent insulating property. For example, magnesium oxide, zirconium oxide, aluminum nitride, silicon nitride or the like may be used. In this embodiment, the granulated material made of alumina is used in view of the insulating property and the easy availability thereof.

In the inside of the metallic outer sleeve 8, around the small-diameter portion 4*b* of the ceramic heater 4, that is, around the connecting portion between the small diameter portion 4*b* and the cup portion 10*a* of the electrode lead-out wire 10. the granulated powder 18 made of the inorganic insulating material is filled. Thereafter, in the remaining space of the inside of the metallic outer sleeve 8, in which the connecting portion of the electrode lead-out wire 10 and the electrode lead-out rod 12 is accommodated a heat-resistant insulating powder (for example, magnesium oxide (MgO)) or the like 20 is filled. Next, a sealing member 22 made of rubber (for example, silicon rubber, fluoro rubber or the like) is inserted into the opening portion 8*b* of the metallic outer sleeve 8. By inserting this sealing member 22 into the inside of the opening portion 8*b* of the metallic outer sleeve 8, it is possible to prevent spilling of the heat-resistant insulating powder 20 when swaging is carried out in the subsequent steps. Further, it is also possible to prevent the electrode lead-out rod 12 from coming into contact with the metallic outer sleeve B.

Thereafter, by applying swaging to the rear portion side of the metallic outer sleeve 8 in which the connecting portion between the electrode lead-out wire 10 and the electrode lead-out rod 12 is accommodated, the outer diameter of the rear portion side of the metallic outer sleeve 8 is reduced. By performing such swaging, the heat-resistant insulating powder 20 is brought into a highly dense state thus fixing the electrode lead-out wire 10 and the electrode lead-out rod 12 in the inside of the metallic outer sleeve 8.

To the rear end portion 12*b* of the electrode lead-out rod 12 which is fixed to the metallic outer sleeve B by swaging in the above-mentioned manner, the distal end 14*a* of the external connecting terminal 14 is fixed by butt welding or the like. Then, into the inside of an inner hole 16*b*, an integral assembly of the ceramic heater 4, the metallic outer sleeve 8, the electrode lead-out wire 10, the electrode lead-out rod 12 and the external contact terminal 14 is inserted from the distal end portion 16*a* of the housing 16 in a state that the threaded portion 14*b* side at the rear end of the external connecting terminal 14 comes first. The assembly is inserted into the inside of the housing 16 and is press-fitted into the inner hole 16*b* of the housing 16 from the rear portion side of the metallic outer sleeve 8 thus fixing the metallic outer sleeve 8 in the housing 16. Here, the means for fixing the metallic outer sleeve 8 in the housing 16 is not limited to the press fitting and the metallic outer sleeve 8 may be fixed in the housing 16 by other means.

When the assembly of the ceramic heater 4, the metallic outer sleeve 8, the electrode lead-out wire 10, the electrode lead-out rod 12 and the external contact terminal 16 is inserted and fixed in the housing 16, a threaded portion 14*b* for battery connection which is formed on a rear end of the external connecting terminal 14 projects from a rear end portion 16*c* of the housing 16. An insulating bushing 24 is fitted on the threaded portion 14*b* from outside thereof and is inserted into the inside of a large-diameter hole 16*d* formed in the rear end of the housing 16 and, thereafter, a nut 26 made of aluminum is threadedly engaged with the threaded portion 14*b* from the outside thus fixing the external connecting terminal 14 to the housing 16. Here, a threaded portion 16*e* for mounting on a cylinder head of an engine not shown in the drawing is formed on a substantially middle portion of the outer surface of the housing 16, while a hexagonal nut portion for fastening the threaded portion 16*e* is formed on the outer surface of the rear end portion 16*c* of the housing 16.

As described above, conventionally, in the whole inside of the metallic outer sleeve in which the rear end portion of the ceramic heater and the electrode lead-out fitting are connected, the heat-resistant insulating powder made of magnesium oxide or the like is filled and, thereafter, brought into a highly dense state by swaging thus fixing the electrode lead-out fitting in the metallic outer sleeve. However, according to this embodiment, around the connecting portion of the small-diameter portion 4*a* formed on the rear end portion of the ceramic heater 4 and the electrode lead-out wire 10 which corresponds to the electrode lead-out fitting, the granulated powder material 18 made of an inorganic insulating material is filled. The granulated material 18 contains fine powder which includes the primary particles of 5 μm or less and has the granulated particle size which falls within a range from 30 to 200 μm. Therefore, the rigidity of the granulated material 18 is extremely low and hence, even when a bending stress is applied to the distal end of the ceramic heater 4 or the metallic outer sleeve 8 is deformed, it is possible to prevent the rupture of the small-diameter portion 4*b* formed on the rear end portion of the ceramic heater 4.

The invention claimed is:

1. A ceramic heater-type glow plug comprising:

a ceramic heater;

a metallic outer sleeve one end portion of which holds the ceramic heater and the other end portion of which is fixed in an inner hole of a housing;

an electrode lead-out member which is connected to one electrode of the ceramic heater at a connecting portion, the connecting portion being disposed inside of the metallic outer sleeve;

an insulating material of a polycrystalline solid having a high rigidity and disposed to fill in the metallic outer sleeve as a sealing material; and a granulated powder of a low rigidity and made of an inorganic insulating material is disposed to fill the metallic outer sleeve externally around the connecting portion of the ceramic heater and the electrode lead-out member.

2. A ceramic heater-type glow plug according to claim 1, wherein a small-diameter portion is formed on an end portion of the ceramic heater which is positioned inside the metallic outer sleeve, and the one electrode of the ceramic heater and the electrode lead-out member are connected to each other on the small-diameter portion.

3. A ceramic heater-type glow plug according to claim 1, wherein the granulated powder is formed of a granulated material made of fine powder with primary particles having a particle size of 5 μm or less.

4. A ceramic heater-type glow plug according to claim 1, wherein a particle size of the granulated powder is from 30 to 200 μm.

5. A ceramic heater-type glow plug according to claim 1, wherein the insulating material of a polycrystalline solid of high rigidity filled in the inside of the metallic outer sleeve is a heat-resistant insulating powder which is brought into a highly dense state by swaging after being filled.

6. A ceramic heater-type glow plug comprising:

a ceramic heater element having a body portion and an electrode;

a metallic outer sleeve having a hollow interior, a distal end portion in which said ceramic heater element is disposed, and a proximal end portion configured for being fixed within a housing of an engine;

an electrode lead-out member connected to said electrode at a connection area disposed within said hollow interior of said metallic outer sleeve;

a granulated powder of a low rigidity and made of an inorganic insulating material disposed in said hollow interior of said metallic outer sleeve externally around said connection area; and an insulating material of a high rigidity disposed in substantially all remaining areas of said hollow interior of said metallic outer sleeve.

7. The ceramic heater-type glow plug according to claim 6 wherein said insulating material is disposed externally of said body portion.

8. The ceramic heater-type glow plug according to claim 6, wherein said ceramic heater element has a distal end which projects beyond said distal end portion of said metallic outer sleeve and a proximal end disposed in said distal end portion of said metallic outer sleeve, said proximal end of said ceramic heater element having a reduced-diameter portion forming part of said connection area between said electrode lead-out member and said electrode, said granulated powder being disposed around said reduced-diameter portion between an interior surface of said metallic outer sleeve and said reduced-diameter portion.

9. The ceramic heater-type glow plug according to claim 6, wherein said ceramic heater element has a distal end which projects from said distal end portion of said metallic outer sleeve and a proximal end disposed in said distal end portion of said metallic outer sleeve, said proximal end of said ceramic heater element having a diameter less than an interior diameter of said distal end portion of said metallic outer sleeve such that an annular space is defined substantially radially between said proximal end of said ceramic heater element and said metallic outer sleeve, said granulated powder being disposed in the annular space.

10. The ceramic heater-type glow plug according to claim 9, wherein said electrode lead-out member includes a cup-shaped part on a distal end thereof and a coil on a proximal end thereof, said cup-shaped part engaging said proximal end of said ceramic heater element, said glow plug further including an electrode lead-out rod of a conductive metal having a distal end disposed in and electrically connected to said coil, said electrode lead-out rod having a proximal end for connection to an external contact terminal, and said insulating material fixing said electrode lead-out member and said electrode lead-out rod within said metallic outer sleeve.

11. A ceramic heater-type glow plug comprising:

a ceramic heater;

a metallic outer sleeve one end portion of which holds the ceramic heater and the other end portion of which is fixed in an inner hole of a housing;

an electrode lead-out member which is connected to one electrode of the ceramic heater in the inside of the metallic outer sleeve;

an insulating material which is filled in the metallic outer sleeve as a sealing material; and a granulated powder made of an inorganic insulating material is filled around a connecting portion of the ceramic heater and the electrode lead-out member, and a particle size of the granulated powder is from 30 to 200 μm.

* * * * *